United States Patent [19]
Jantz

[11] Patent Number: 5,944,838
[45] Date of Patent: Aug. 31, 1999

[54] METHOD FOR FAST QUEUE RESTART AFTER REDUNDANT I/O PATH FAILOVER

[75] Inventor: Ray M. Jantz, Wichita, Kans.

[73] Assignee: LSI Logic Corporation, Milpitas, Calif.

[21] Appl. No.: 08/828,614

[22] Filed: Mar. 31, 1997

[51] Int. Cl.$^6$ ................................................. G06F 11/00
[52] U.S. Cl. ....................................... 714/6; 714/7; 714/9
[58] Field of Search ........................ 711/114; 340/825.5; 395/401, 650; 714/6, 7, 9

[56] References Cited

U.S. PATENT DOCUMENTS

| | | | |
|---|---|---|---|
| 3,702,006 | 10/1972 | Page ............................................ | 444/1 |
| 5,101,492 | 3/1992 | Schultz et al. ............................ | 395/575 |
| 5,148,432 | 9/1992 | Gordon et al. ........................... | 371/10.1 |
| 5,155,845 | 10/1992 | Beal et al. ................................ | 364/236.2 |
| 5,210,860 | 5/1993 | Pfeffer et al. ............................. | 395/575 |
| 5,249,279 | 9/1993 | Schmenk et al. ......................... | 395/425 |
| 5,317,731 | 5/1994 | Dias et al. ................................ | 395/600 |
| 5,317,752 | 5/1994 | Jewett et al. ........................... | 364/231.6 |
| 5,331,476 | 7/1994 | Fry et al. .................................. | 360/53 |
| 5,367,669 | 11/1994 | Holland et al. ........................... | 395/575 |
| 5,386,324 | 1/1995 | Fry et al. .................................. | 360/53 |
| 5,388,108 | 2/1995 | DeMoss et al. ......................... | 371/51.1 |
| 5,440,743 | 8/1995 | Yokota et al. ........................... | 395/650 |
| 5,446,855 | 8/1995 | Dang et al. .............................. | 395/401 |

(List continued on next page.)

FOREIGN PATENT DOCUMENTS

| | | |
|---|---|---|
| 0493984 | 7/1992 | European Pat. Off. ........ G06F 11/10 |
| 0551718 | 7/1993 | European Pat. Off. ........ G06F 11/20 |
| 0707269 | 4/1996 | European Pat. Off. ........ G06F 12/08 |
| 0645702 | 3/1995 | Germany . |
| 9513583 | 5/1995 | WIPO .............................. G06F 12/00 |

OTHER PUBLICATIONS

Arif Merchant and Philip S. Yu 'Analytic Modeling of Clustered RAID with Mapping Based on Nearly Random Permutation', IEEE Transaction on Computer, vol. 45, No. 3, Mar. 1996.

William V. Courtright II, Garth Gibson, Mark Holland, and Jim Zelenka 'A Structured Approach to Redundant Disk Array Implementation', IEEE Computer Soc. Press, Sep. 1996.

Edward K. Lee and Randy H. Katz 'The Performance of Parity Placements in Disk Arrays', IEEE Transaction on Computer, vol. 42, No. 6, Jun. 1993.

Mark B. Friedman 'RAID keeps going and going and . . . ' IEEE Spectrum, Apr. 1996.

A Case for Redundant Arrays of Inexpensive Disks (RAID); David Patterson, Garth Gibson & Randy Katz; Dec., 1987; pp. 1–24.

*Primary Examiner*—Hassan Kizou
*Assistant Examiner*—Nguyen Xuan Nguyen
*Attorney, Agent, or Firm*—Wayne P. Bailey; Daniel N. Fishman

[57] ABSTRACT

A redundant storage control module (also referred to as RDAC or multi-active controller) maintains a queue of pending I/O requests sent for processing via a first asynchronously operating I/O path. In the event of failure of the first asynchronously operating I/O path, the controller restarts the entire queue of pending I/O requests to a second I/O path without waiting for each request to individually fail from the first path. Some prior techniques required the RDAC module to await failure of each I/O request sent to the failed first I/O path before restarting each failed request on the secondary I/O path. Such techniques greatly extend the total time required to restart all operations sent to a failed I/O path, by awaiting the failure of all I/O requests previously sent to the first I/O path. Other known techniques provide non-standard features in the lower level driver modules to permit the higher level RDAC modules to directly manipulate dispatch queues maintained for each I/O path within the low level device drivers. Such prior techniques reduce the wait time for restart of failed I/O requests but at the expense of portability of the RDAC modules. The methods and structure of the present invention reduce the wait time for restart of failed I/O requests but in such a manner as to remain portable over a variety of host systems.

34 Claims, 5 Drawing Sheets

U.S. PATENT DOCUMENTS

| | | | |
|---|---|---|---|
| 5,455,934 | 10/1995 | Holland et al. | 714/6 |
| 5,459,864 | 10/1995 | Brent et al. | 395/650 |
| 5,463,643 | 10/1995 | Gaskins et al. | 714/9 |
| 5,535,365 | 7/1996 | Barriuso et al. | 395/482 |
| 5,546,535 | 8/1996 | Stallmo et al. | 395/182.07 |
| 5,548,711 | 8/1996 | Brant et al. | 714/9 |
| 5,574,863 | 11/1996 | Nelson et al. | 714/6 |
| 5,608,891 | 3/1997 | Mizuno et al. | 714/6 |
| 5,678,026 | 10/1997 | Vartti et al. | 395/479 |
| 5,682,537 | 10/1997 | Davies et al. | 395/726 |
| 5,694,571 | 12/1997 | Fuller | 395/440 |
| 5,708,771 | 1/1998 | Brant et al. | 714/6 |
| 5,742,239 | 4/1998 | Siloti | 340/825.5 |
| 5,764,922 | 6/1998 | Peacock et al. | 395/275 |
| 5,787,304 | 7/1998 | Hodges et al. | 395/821 |
| 5,787,463 | 7/1998 | Gajjar | 711/114 |
| 5,790,775 | 8/1998 | Marks et al. | 714/7 |

METHOD FOR FAST QUEUE RESTART AFTER REDUNDANT I/O PATH FAILOVER

BACKGROUND OF THE INVENTION

1. Field of the Invention

The present invention relates generally to redundant storage subsystems, and in particular to portable and fast restart methods operable in redundant I/O path controllers such as are often employed in control of storage subsystems.

2. Background of the Invention

Modern mass storage systems are growing to provide increasing storage capacities to fulfill increasing user demands from host computer system applications. Due to this critical reliance on large capacity mass storage, demands for enhanced reliability are also high. A popular solution to the need for increased reliability is redundancy of component level subsystems. Redundancy is typically applied at many or all levels of the components involved in the total subsystem operation. For example in storage subsystems, redundant host systems may each be connected via redundant I/O paths to each of redundant storage controllers which in turn each may be connected through redundant I/O paths to redundant storage devices (e.g., disk drives).

Redundant I/O paths can take any of a number of forms, including but not limited to SCSI buses, host adapters, or RAID controllers. In a system with redundant I/O paths connecting a storage controller to the storage device(s), there is a control sub-subsystem which manages the redundant paths referred to herein "Redundant Dual-Active Control" (RDAC). An RDAC control subsystem is often a layer of software in a hierarchical layering of control software which provides the interface between the host systems and storage subsystems.

One skilled in the art will recognize that the RDAC layer is a logical component, typically embodied as a software module. The RDAC layer typically operates within either the host system (as part of the operating system) or may be operable within intelligent I/O adapters in the host as well as embedded storage controllers within the storage subsystem. The physical components on which the RDAC layer is operable are not particularly relevant to the layered architecture of which the RDAC layer is a component. It is generally desirable that the RDAC layer operate at a higher level thus enabling it to encompass control of a larger number of I/O path elements in its failure recovery techniques.

Further, one skilled in the art will recognize that the RDAC may be generalized to multiple active controllers rather than merely two or dual active controllers. Additional redundancy and scalability of performance may be achieved through use of multiple active controllers. As used herein, RDAC represents both dual-active and multi-active redundant control systems.

The RDAC layer sends I/O requests to a preferred path of the redundant I/O paths which connect it to the storage devices. Typically, the RDAC layer sends its requests to another lower layer of the software referred to herein as the low level disk driver or disk driver. Once sent to the disk driver, the RDAC layer is free to process other requests while awaiting completion of the first request.

It is frequently the case that the low level disk driver uses a queue structure (referred to herein as a dispatch queue) to provide a buffered interface to the higher level (e.g., RDAC) software layers. The low level disk driver's performance is gated by the speed of the disk drives and is therefore substantially slower than the higher level software components. A dispatch queue is associated with each I/O path within the low level disk driver to buffer its slower operation as compared to the RDAC layer. The RDAC layer transfers requests to the low level disk driver layer which in turn queues the generated I/O requests on the dispatch queue for the desired I/O path if the low level disk driver is not prepared to process the request immediately. The RDAC layer does not therefore have direct access to the dispatch queue. Rather, the dispatch queue is a common mechanism used within the low level disk driver used to buffer requests from the higher level software layers. The low level disk driver performance is gated by the performance of the disk drives themselves and thus operates much slower than may the higher level software layers (e.g., the RDAC layer). These dispatch queues can become quite long. It is possible that there may be thousands of I/O requests waiting in the dispatch queue for processing by the low level disk driver.

A variety of failures could occur such that the RDAC layer might not be able to access the storage device via one of the redundant I/O paths (e.g., via the preferred I/O path). A software failure in the low level disk driver module is one example of such a failure. Or for example a hardware failure might occur in the physical connection from the disk driver module to the disk array. In general, all such failures which render the I/O path unusable to the RDAC layer will be identified herein as I/O path failures. An I/O path which has failed is also referred to herein as a bad path or failed I/O path while an operational I/O path is also referred to herein as a good path or operational I/O path. In general, when the RDAC layer becomes aware of such a failure in an I/O path (the bad path), failed I/O requests are redirected (retried) on the other I/O path (the good path).

The low level disk driver processes the I/O requests and notifies the RDAC of success or failure of each I/O request in due course as each request is processed. In the case of a failed I/O request, the low level disk driver may possibly attempt to process the request several times before sending that I/O request back to the RDAC as a failure. The low level disk driver will then move on to the next I/O request in the I/O path's associated dispatch queue and will attempt to process it before sending it back to the RDAC as another failure. Since the cause of the failures is the I/O path itself, the entire dispatch queue of I/O requests is destined to fail. However each request must wait in the dispatch queue within the low level disk driver for its turn to fail, potentially including a number of retries, and only then be returned by the low level disk driver as a failure to the RDAC layer.

One method for returning the failure status of processed requests is to provide a failed I/O queue filled by the disk driver layer for consumption by the RDAC layer. A failure return status for each processed request which failed to complete is placed in the failed I/O queue by the disk driver. Asynchronously with respect to the disk driver, the RDAC layer processes the failed requests in the failed I/O queue by sending them back to the disk driver via the dispatch queue of redundant good path. The disk driver eventually processes the requeued request on the redundant good path to complete processing of the request.

Under this known method, each failed I/O request must make a potentially time consuming "round trip" through the layered system. First, a request is generated in the RDAC layer and transferred to the low level disk driver level. In the low level disk driver level, the request is placed in the associated dispatch queue for the first of two redundant I/O paths which eventually fails. The queued request must wait for all the I/O requests (potentially thousands) ahead of it to be individually processed and failed by the disk driver. In a situation where there is a significant backlog of I/O requests in the first I/O path dispatch queue, the low level disk driver may require a significant amount of time to complete processing of all failed I/O requests. For each request, detection of a failure may require a number of retries of the I/O request. In the case of a certain types of failures of the I/O path, each retry may require a significant period of time before the failure is sensed (e.g., lengthy timeouts). When an I/O request finally fails, it may then wait in the failed I/O queue until the RDAC can reprocess the failed request by sending it to the low level disk driver's alternate I/O path (the good path). The cumulative processing and delay for reprocessing all failed I/O requests can therefore be quite significant. Thus the restart after failover from a bad I/O path to a good I/O path (the redirection of all failed I/O requests from the bad path to the good path) is slowed considerably. The time necessary for the restart to finish detecting each failure and reprocessing it on an alternate path is simply the time for one failure to be detected multiplied by the number of requests in the low level disk driver's dispatch queue when the I/O path is first detected to have failed.

Some prior solutions to reduce this requeueing time involve a host system based approach to solving this problem such as customizing the low level disk driver to provide special failover features. The host system may for example flush the dispatch queue at the first failure using a special access function (API function) within a customized low level disk driver. The flushed I/O requests are re-routed at the host system to another data path. This approach is dependent upon the host system's low level disk driver having a unique ability to, for example, flush pending I/O requests and thus this solution is unique and therefore non-portable between various host systems.

It is clear from the above discussion that a need exists for an improved method for fast restart of failover of I/O requests from a failed (bad) I/O path to an alternate, operational (good) I/O path. In addition, it is desirable that such a fast failover method be portable so as to be easily implemented within any host system.

SUMMARY OF THE INVENTION

The present invention solves the above and other problems, and thereby advances the state of the useful arts, by providing portable methods for fast restart after failover from one I/O path to another. In particular, the present invention allows a fast restart of I/O operations of storage subsystems such as RAID systems. Use of standardized disk system features with alterations only to the RDAC layer makes the present invention highly portable from one host system to another.

The RDAC layer of the present invention is altered to copy each I/O request it sends to the low level disk driver into a pending I/O queue. When an I/O path fails, the RDAC will become aware of the problem at the time the first I/O request failure status is returned from the disk driver (via standard RDAC/disk driver interface features of the system). The RDAC will then interrogate its pending I/O queue to find the failed request and all other pending requests which were in the low level disk driver's dispatch queue for the bad I/O path. The RDAC pending I/O queue contains all of the previously submitted I/O requests for the bad I/O path. This enables the RDAC layer to immediately transfer (restart) all such pending requests on an alternate I/O path (the good path). The RDAC sends all of these requests from the pending I/O queue to the redundant good I/O path without waiting for each individual I/O request to return a failure status from the low level disk driver's processing of queued requests in the bad I/O path. When subsequent I/O requests queued in the bad I/O path's dispatch queue eventually fail, the corresponding failure message returned from the low level disk driver to the RDAC layer is simply discarded by the RDAC layer. The corresponding entry in the pending I/O queue may then be removed.

The failover restart method of the present invention provides for faster reprocessing of failed I/O requests by requeueing all request from the failed path to the good path in response to the first failure from the bad path. The reprocessing of failed (including about to fail) I/O requests can therefore begin as soon as the first failure is detected in the bad I/O path.

Another important benefit of the present invention is that because only the RDAC layer is altered, standard disk subsystem components can be used so that the method is easily portable from one host computer to another. In other words, the methods and structure of the RDAC layer of the present invention do not require customized features in the low level disk driver. Rather, minimal features of the low level disk driver are utilized and only the RDAC layer is customized to include the pending I/O queue features of the present invention. The RDAC layer of the present invention is therefore portable to a wide variety of computing environment which support standardized interfaces and features in the low level disk driver layer.

It is therefore an object of the present invention to provide methods for operation of a storage subsystem for fast restart of I/O requests on a redundant I/O path after failover from a failed I/O path.

It is further an object of the present invention to provide methods for operation of a storage subsystem for fast restart of I/O requests on a redundant I/O path after failover from a failed I/O path wherein such methods are portable to operate in conjunction with a variety of host computing systems.

It is another object of the present invention to provide methods for using a pending I/O queue for fast restart of I/O requests on a redundant I/O path after failover from a failed I/O path.

DETAILED DESCRIPTION OF THE PREFERRED EMBODIMENT

Figure 1:
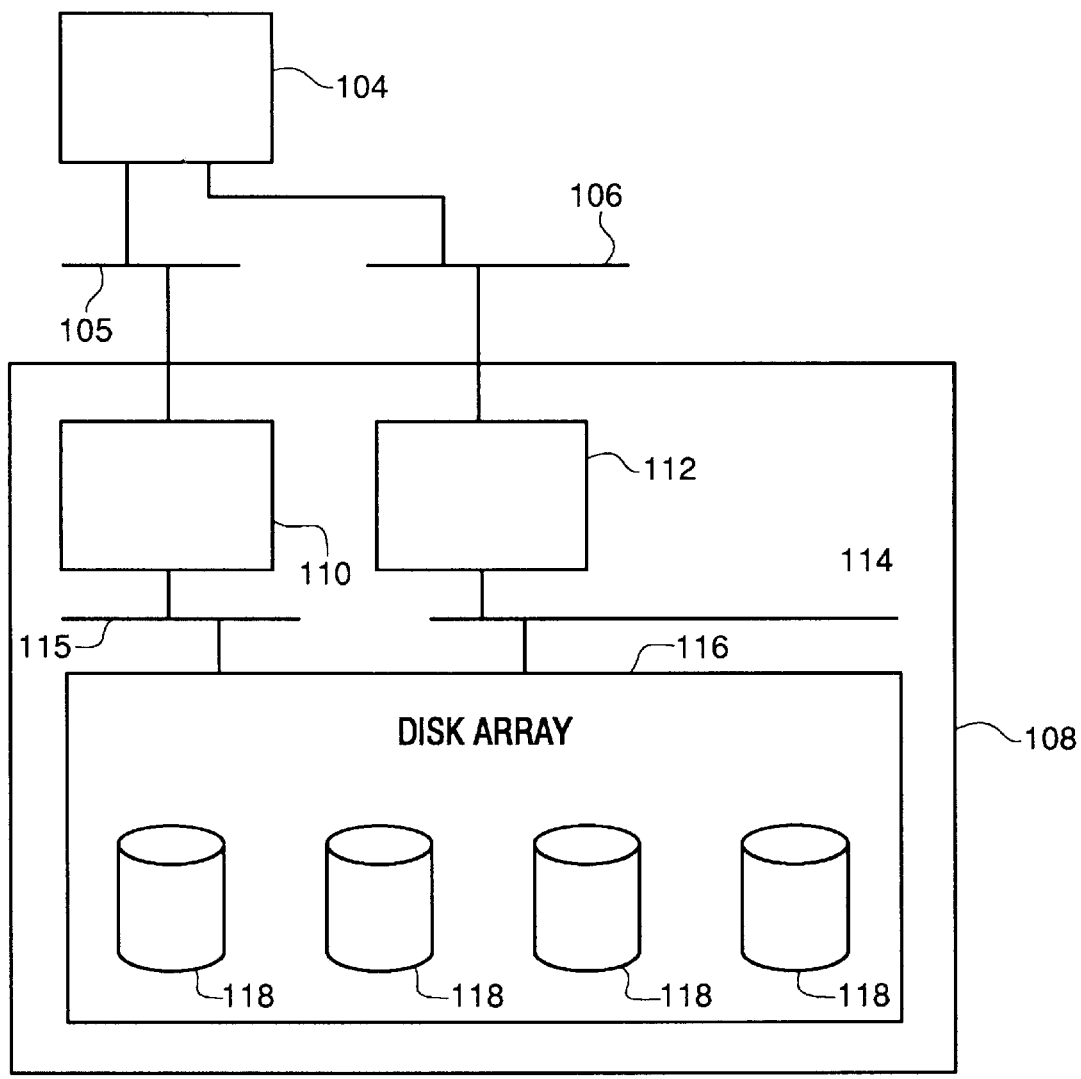
FIG. 1 is a block diagram of a typical computer system in which the methods of the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 depicts an exemplary computing environment in which the methods and apparatus of the present invention are operable to provide fast, portable, failover restart of I/O requests after an I/O path failure. Host system 104 is connected via redundant buses 105 and 106 to the data storage subsystem 108. Data storage subsystem 108 includes redundant storage control modules 110 and 112 connected to redundant buses 105 and 106, respectively. Control modules 110 and 112 are, in turn, connected via redundant buses 114 and 115, respectively, to disk array 116, containing a plurality of redundant disk drives 118.

One of ordinary skill will recognize that control modules 110 and 112 may provide RAID storage management functions for disk array 116. The methods of the present invention are applicable within host systems interfaced to storage subsystems having redundant paths therebetween. RAID storage management is a common configuration for such storage subsystems offering redundant operations but is not required for operation of the methods of the present invention on an attached host system.

As shown in FIG. 1, bus 105, control module 110, and bus 115 form a first I/O path between host system 104 and disk array 116. Bus 106, control module 112, and bus 114 form a second (redundant) I/O path between host system 104 and disk array 116. One of ordinary skill will further note that I/O adapters within host system 104, a first attached to bus 105 and a second attached to bus 106, may form yet another component of each of the redundant I/O paths. Further, it will be recognized that any number of I/O paths may connect host system 104 to disk array 116. FIG. 1 is therefore intended only as exemplary of one computing environment in which the methods of the present invention may be advantageously applied. Many similar computing environments will be recognized by those skilled in the art.

Figure 2:
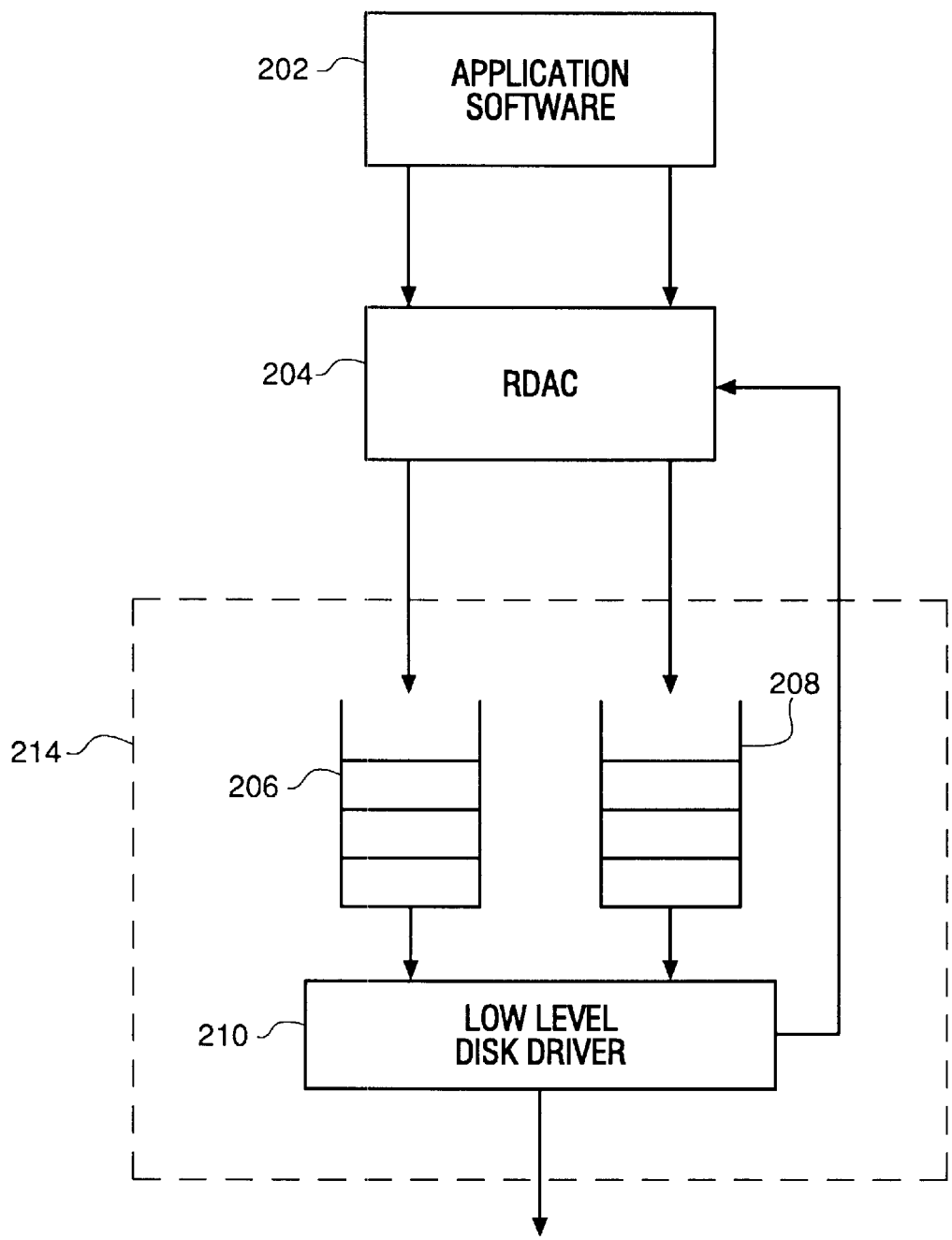
FIG. 2 is a block diagram showing the inter-relation of the RDAC, one disk driver, and the various I/O request queues used in the prior art.

FIG. 2 is a simplified block diagram depicting the flow of I/O requests in an RDAC system as known in the prior art. The application software 202 sends I/O requests to the RDAC 204. RDAC 204 then transfers the requests to low level disk driver 210 for further processing on a particular I/O path. Low level disk driver 210 then queues these requests in path A dispatch queue 206 for asynchronous processing by the low level disk driver 210. The low level disk driver 210 in turn controls the operation of the storage array (e.g., RAID LUNs not pictured) to process the I/O requests.

In the event of failure by I/O path A, the I/O requests sent via that route may all be destined to fail upon processing by the low level disk driver 210. However, the low level disk driver 210 will continue to process them one at a time out of the path A dispatch queue 206. Since in the event of such a hardware failure, the individual I/O requests may require an excessive amount of time to be handled and failed, the individual I/O requests may sit in the path A dispatch queue 206 for a considerable time while the potentially thousands of requests ahead of them are processed one by one.

When a failed I/O request is finally processed by the low level disk driver 210, it will be sent back to the RDAC via failed I/O queue 212. RDAC 204 retrieves the failed status from queue 212 and then places the failed I/O request into the path B dispatch queue 208 for processing by the low level disk driver 210 on path B (the good I/O path). One skilled in the art will recognize that failed I/O request queue 212 represents one common technique for return of such failure status to the RDAC 204. A variety of other equivalent techniques and structures may be employed to provide a buffered or nonbuffered communication path for return of failure and success status messages from low level disk driver 210 or RDAC 204.

As is known in the prior art and as is shown in FIG. 2, each failed request will await its turn in the path A dispatch queue 206 until low level disk driver 210 processes the request, determines that it has failed, and queues the failure status back to RDAC 204 via failed I/O queue 212. RDAC 204 will eventually recognize the failure status in the failed I/O queue 212 and restart the failed operation on the alternate operational path B. The wait for each individual I/O request to fail can be significant where the failure detection requires, for example, awaiting a timeout period and a number of retries of the timed out operation. The cumulative delay required to complete the restart of all operations in the dispatch queue 206 of the failed I/O path is therefore potentially very long where the dispatch queue contains a significant number of entries at the time of failure of the preferred I/O path.

As noted above, path A dispatch queue 206 (as well as path B dispatch queue 208) are constructs created and maintained within low level disk driver 210. The dispatch queues are used to buffer the high speed generation of I/O requests by the higher level software layers (e.g., application layer 202 and RDAC layer 204). Performance of low level disk driver 210 is gated by the relatively slow performance of the storage array (e.g., RAID LUNs not shown). The dispatch queues therefore serve to buffer I/O requests until low level disk driver 210 is ready to process the next request. The path A dispatch queue 206 may therefore have thousands of I/O requests waiting therein for processing by low level disk driver 210.

Without special (non-standard) features provided by the low level disk driver 210, the RDAC layer 204 has no direct access to, or control over, the dispatch queues 206 and 208. This state is indicated by the dashed line 214 encompassing the dispatch queues 206 and 208 and the low level disk driver 210. Prior techniques have provided such special, non-standard features within a customized low level disk driver 210 to permit RDAC 204 direct control of the dispatch queues. For example, some prior techniques may permit RDAC layer 204 to retrieve entries from the dispatch queue or to flush entries in the dispatch queue. However, such techniques are highly non-portable between heterogeneous computing systems. Rather, such solutions depend upon custom features of the low level disk driver of a particular computing environment. Porting such RDAC modules which are dependent upon customized low level disk driver features is a formidable task.

Portable, Fast, Failover Restart of I/O Operations

Figure 3:
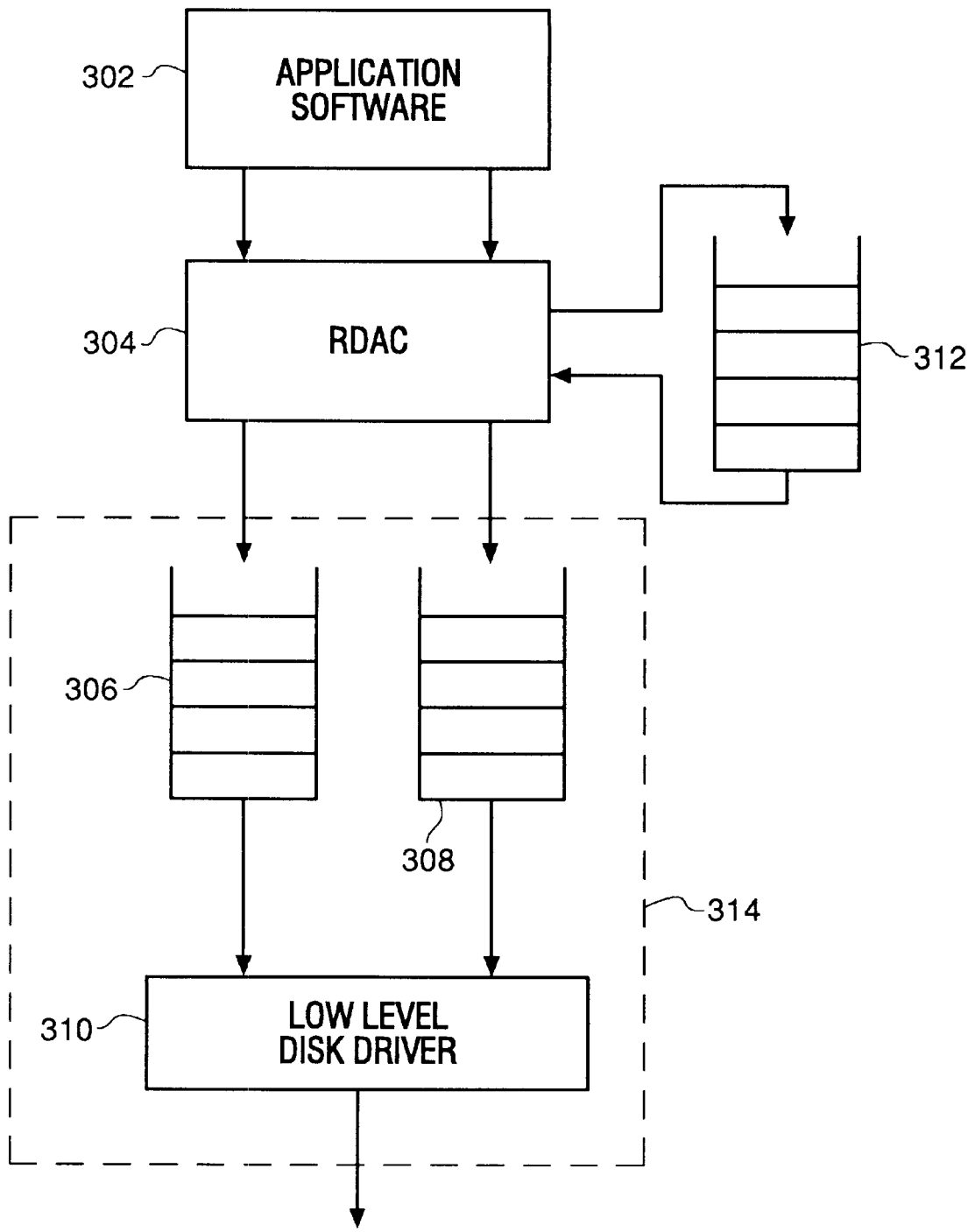
FIG. 3 is a block diagram showing the inter-relation of the RDAC, one low level disk driver, and the various I/O request queues used in the present invention, including the pending I/O queue.

FIG. 3 is a simplified block diagram showing the handling of I/O requests by the methods of the present invention. Application software 302 sends I/O requests to RDAC 304, which in turn transfers them to (standard) low level disk driver 310. As above with respect to FIG. 2, low level disk driver 310 maintains dispatch queues 306 and 308 corresponding to each redundant I/O path for purposes of buffering the generation of I/O requests by RDAC 304 and the slower, asynchronous processing of I/O requests on the storage array (e.g., RAID LUNs not shown). Low level disk driver 310 controls the storage array to perform the requested I/O operations in due course asynchronously with respect to the processing of RDAC 304. RDAC 304 also maintains a pending I/O queue 312 containing a copy of each I/O request sent to low level disk driver 310 and thereby queued on path A dispatch queue 306.

RDAC 304 controller preferably maintains a single pending I/O queue 312 in which a copy of each I/O request is maintained until it is completed. Any particular I/O request in the pending I/O queue 312 could be pending on path A or on path B depending on which I/O path was selected for initiation of the request. Alternatively, RDAC 304 could maintain a separate pending I/O queue for path B as well and thus it might undertake the same process for I/O requests directed to path B (whether originally directed thereto or redirected thereto in response to failover restart). One skilled in the art will recognize that the principle of maintaining a pending I/O queue associated with an I/O path may be extended to any number of alternate redundant I/O paths. Further, pending I/O queue 312 may be implemented by any of several techniques well known to those skilled in the arts. Various well known software data structures and algorithms and hardware structures can be utilized in creating such a queue, including for example: a linked list, a priority queue, hardware FIFO circuits, data tables, and many others.

In normal processing of I/O requests, the copy of an I/O request in pending I/O queue 312 is removed when the I/O request is successfully completed by the low level disk driver 310. However, when an I/O request first fails on the bad I/O path, RDAC 304 uses the pending I/O queue 312 to rapidly identify all I/O requests pending within the low level disk driver 310 (e.g., within dispatch queue 306 for I/O path A) and restart all such identified I/O requests on the alternate good I/O path.

The benefit of the present invention is shown by considering the flow of I/O requests in the event of a failure on a first I/O path A. The low level disk driver 310 sends the first of the failed I/O requests back to RDAC 304. RDAC 304 then searches pending I/O queue 312 for the failed I/O request. Depending upon the data structure and organization of the pending I/O queue 312, locating the first failed I/O request may be as simple as identifying the first entry in the queue. Having found the failed I/O request, RDAC 304 will then transfer the I/O request to the good I/O path via low level disk driver 310. Low level disk driver 310 then queue the request on the good I/O path B dispatch queue 308. In addition, RDAC 304 locates all other pending I/O requests in the pending I/O queue 312 destined to eventually fail in the normal course of processing requests in the now failed bad I/O path A (those presently in dispatch queue 306 of I/O path A awaiting processing by low level disk driver 310). All other such located I/O requests in pending I/O queue 312 are also transferred to the low level disk driver 310 destined for alternate good I/O path B. Low level disk driver 310 then queues the additional, redirected I/O requests on path B's dispatch queue 308. Thus, at the time of completion of the operation, all the potentially thousands of I/O requests still waiting in the path A dispatch queue 306, destined to fail, are also awaiting processing by low level disk driver 310 in the path B dispatch queue 308. Failover restart processing of the I/O requests is therefore not dependent upon the time required for each request to individually fail out of the path A dispatch queue 306. Rather, all requests are redirected to the good I/O path B at the time of sensing the first failure in the bad I/O path A.

Note also that the low level disk driver 310 will continue to process the other I/O requests still remaining in the path A dispatch queue 306 in the normal manner. Due to the irrecoverable nature of the failure in the bad I/O path (path A), each queued I/O request is destined to fail eventually as the low level disk driver 310 continues to process I/O requests in the path A dispatch queue 306. As low level device driver 310 processes each I/O request through to failure, it sends that request back to RDAC 304. Having previously restarted the failed I/O request on the alternate good I/O path, RDAC 304 discards the failure status. Likewise, RDAC 304 discards the failure status messages received corresponding to all other I/O requests still queued in the bad I/O path A dispatch queue 306.

Since the low level disk driver 310 does not require any special abilities, RDAC 304 of the present invention is portable among a wide variety of host systems so long as minimal standard I/O interface API conventions are adopted by the low level disk driver 310 of the system.

Figure 4:
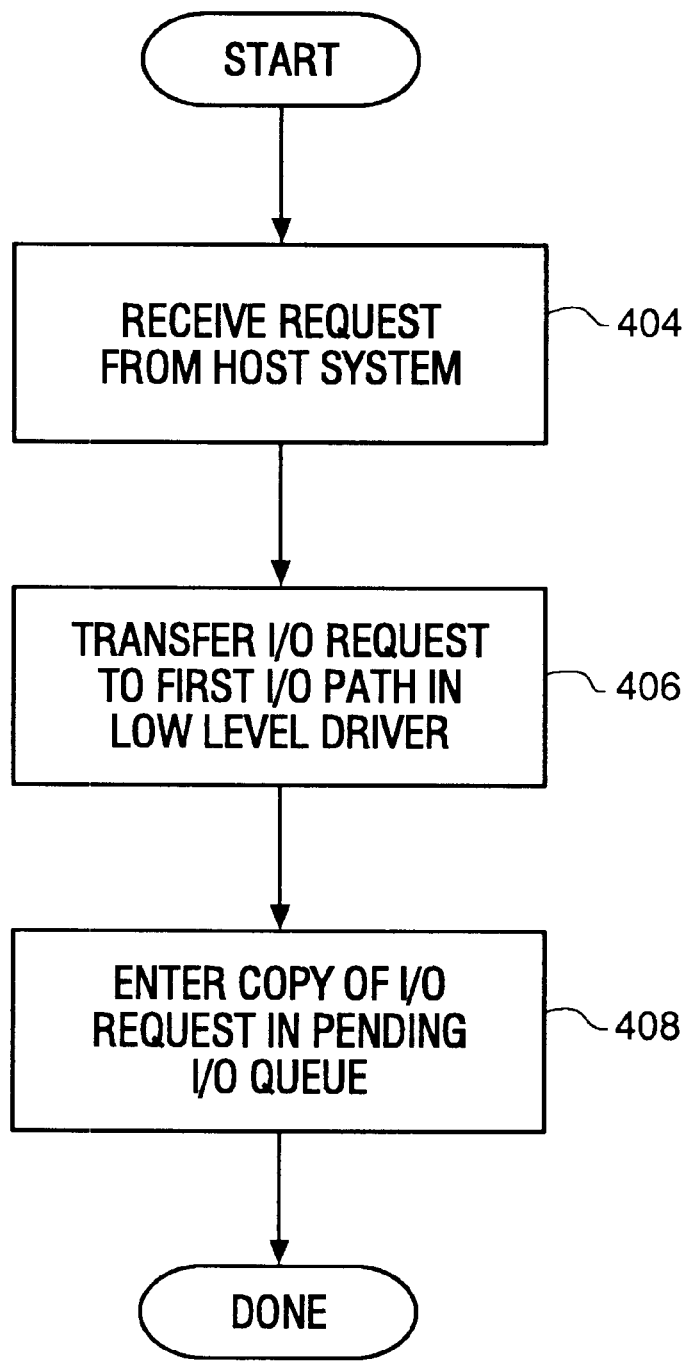
FIG. 4 is a flow chart illustrating the handling of I/O requests by the RDAC in the present invention, before notification of the success or failure of the requests.

FIG. 4 is a flowchart illustrating the operation of RDAC 304 generating I/O requests for transfer to low level disk driver 310. Element 404 is operable to receive an I/O request (e.g., from application software 302 operable within a host computer system). Element 406 is then operable to transfer the I/O request to low level disk driver 310 destined for I/O path A. Element 408 is then operable to copy the I/O request to the pending I/O queue 312. RDAC 304 thereby maintains a copy of all pending I/O requests in its own pending I/O queue. RDAC 304 therefore requires no special, custom, non-portable access to queueing mechanisms within low level disk driver 310 (e.g., dispatch queues 306 and 308).

Low level device driver 310 of FIG. 3 is asynchronously operable to process the I/O request buffered (queued) in its path A dispatch queue 306. Each I/O request in the dispatch queue is processed in sequence to perform the I/O operation identified therein. Low level device driver 310 returns a status message to RDAC 304 indicating the processed I/O request has either succeeded or failed. In case of a failure, low level device driver 310 has performed any required retry of operations to assure that the operation cannot be successfully performed. The processing of low level device driver 310 is typically provided by interface functions within the operating system of the host computer (host system API). Such functions are typically standardized and in compliance with one or more industry standards for such functionality (e.g., UNIX/POSIX, MS Windows®, etc.). The operation of and interface to low level device driver 310 is therefore well known to those skilled in the art.

Figure 5:
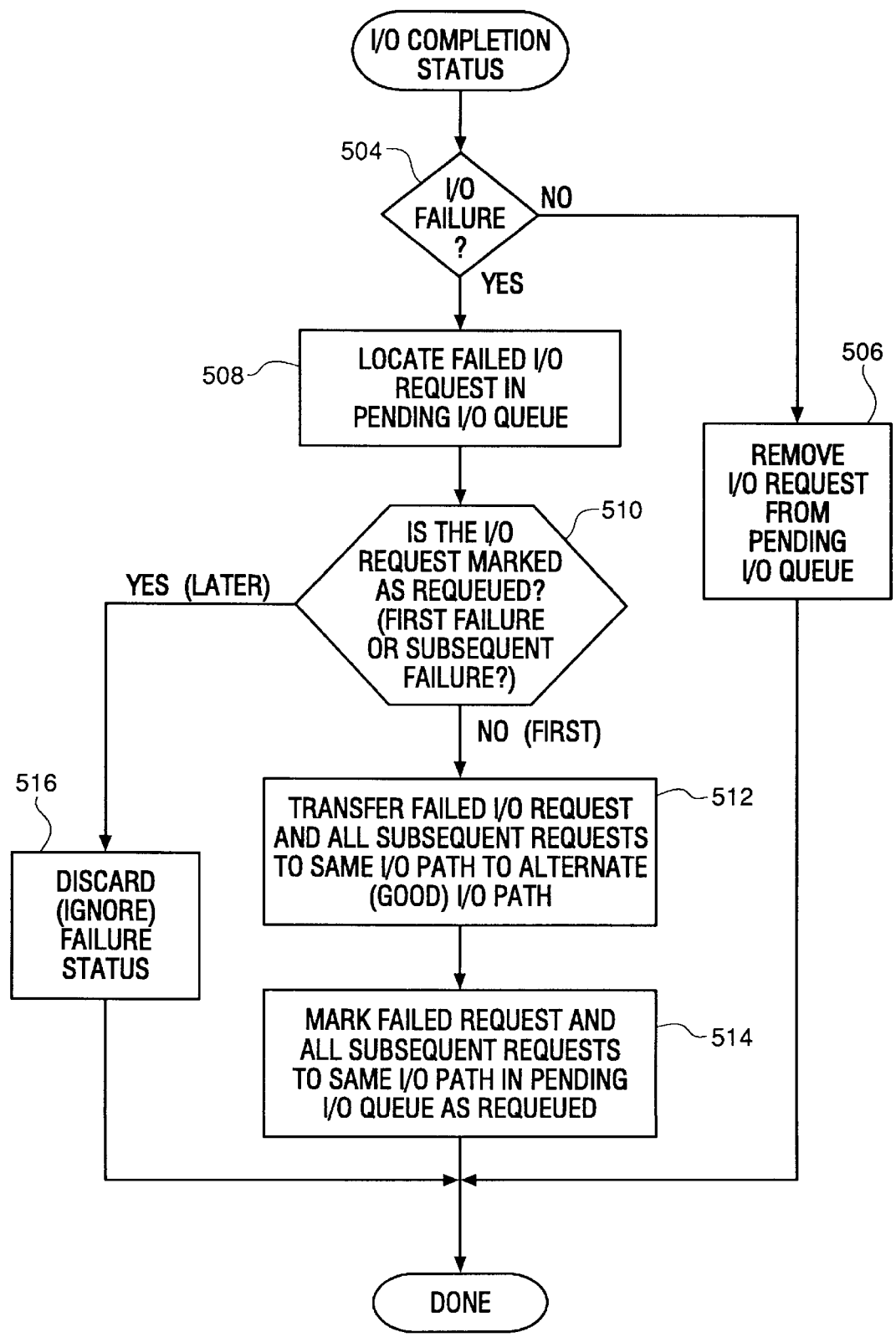
FIG. 5 is a flow chart illustrating the handling of I/O requests by the RDAC in the present invention, after notification of the success or failure of the requests.

FIG. 5 is a flowchart illustrating operation of RDAC 304 in response to receipt of a status message from low level device driver 310 indicating successful or unsuccessful (failed) completion of an I/O request. Element 504 is operable within RDAC 304 to determine whether the received status message indicates a success or a failure in the processing of the associated I/O request. If element 504 determines that processing of the I/O request succeeded (as indicated by the status message), then processing continues with element 506 wherein the I/O request is removed from the pending I/O queue 312. Processing of the I/O request success status message is then complete.

If element 504 determines that processing of the I/O request failed (as indicated by the status message received), then processing continues with element 508 to locate the failed I/O request in pending I/O queue 312. As noted above, I/O requests are generated by RDAC 304, transferred to the preferred I/O path (e.g., I/O path A), and copied into the pending I/O queue 312. Element 508 therefore is operable to locate the queue entry copied to the pending I/O queue 312. The precise steps for locating the entry in the pending I/O queue 312 depend upon the data structure selected to represent the pending I/O queue 312. Such data structures and associated search techniques are well known to those skilled in the art. In the preferred embodiment, each entry in the pending I/O queue indicates the I/O path to which the I/O request was destined and the entries are maintained in the chronological order in which they were generated by RDAC 304. Locating the failed entry therefore preferably includes locating the first (oldest) entry in the queue which identifies the failed I/O path (e.g., I/O path A) as its original destination path.

Next, element 510 is operable in RDAC 304 to check whether the I/O request so located in the pending I/O queue is marked as having already been requeued. As discussed below with respect to element 514, all entries restarted from the pending I/O queue 312 by transferring them to the redundant good I/O path B (path 308) are marked in the pending I/O queue 312 to so indicate. If the queue element located by operation of element 508 is not so marked, then the located queue element represents the first I/O request to fail in association with the failure of the bad I/O path A (path 306). In effect therefore, element 510 is determining whether this particular failed I/O request is the first such request to return as a failure from the low level disk driver 310, with regard to the identified I/O path or rather a subsequent failed I/O request (previously marked when the first failure was detected).

If element 510 determines that the failed I/O request located in the pending I/O queue by operation of element 508 is the first such request (and thus is not marked as having been requeued), element 512 is next operable to transfer the failed I/O request to the alternate I/O path B. Low level disk driver 310 therefore adds the restarted (transferred) I/O request to the I/O path B dispatch queue 308. The action performed by element 512 therefore effectively copies the entry from the pending I/O queue to the alternate I/O path B dispatch queue 308 and is therefore also referred to herein as a requeue operation and the queue entries referred to as requeued I/O requests.

Element 512 is further operable to requeue all other (subsequent) I/O requests from the pending I/O queue 312 to the path B dispatch queue 308 by transfer to the low level disk driver 310. All other such I/O requests are destined to fail due to the failure of I/O path A 306. Next, element 514 is operable to mark all requeued I/O requests so located in the pending I/O queue 310 as having been requeued by operation of element 512. The entries are marked so as to flag the fact that the first failure on the bad I/O path A has been encountered. This fact is relevant to the test discussed above with respect to element 510. A failure status returned from the low level disk driver 310 to RDAC 304 which corresponds to a flagged entry in the pending I/O queue may be discarded. The corresponding I/O request has already been requeued to the alternate I/O path B when the first failure was sensed. Processing of the method of the present invention is then complete with respect to the received status message.

When subsequent failure status messages are received from the low level device driver corresponding to subsequent requeued I/O requests, element 510 will determine that the corresponding I/O request located in the pending I/O queue 310 is marked as having been previously requeued (and is therefore not the first such failure). This determination by element 510 causes element 516 to discard the failure message from the low level device driver 310. The first failure message from the failed path caused all pending I/O requests to be requeued. Therefore, subsequent failure messages from the failed I/O path may be ignored.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for restart of failed input/output operations in a system having a redundant controller management component and having a plurality of asynchronously operating I/O paths, the method comprising the steps of:

transferring at least one I/O request from said redundant controller management component to a first I/O path of said asynchronously operating I/O paths wherein said redundant controller management component has no access to said at least one I/O request as manipulated within said first I/O path;

storing in a pending I/O queue associated with said redundant controller management component an entry containing information regarding said at least one I/O request; and restarting on a second I/O path of said asynchronously operating I/O paths I/O requests having entries in said pending I/O queue previously transferred to said first I/O path in response to receipt of indicia of failure of said first I/O path.

2. The method of claim 1, wherein each of said plurality of asynchronously operating I/O paths corresponds to one of a plurality of redundant multi-active controllers.

3. The method of claim 2, wherein each of said plurality of redundant multi-active controllers is a RAID storage controller.

4. The method of claim 1, wherein each of said asynchronously operating I/O paths comprises an I/O adapter.

5. The method of claim 1 wherein each of said asynchronously operating I/O paths comprises an intelligent I/O adapter.

6. The method of claim 1, wherein said at least one I/O request comprises a plurality of I/O requests and wherein the step of restarting is performed in response to a first said receipt of indicia of failure.

7. The method of claim 6, wherein the step of restarting includes the step of:

marking said entries in said pending I/O queue corresponding to the restarted I/O requests.

8. The method of claim 7, further comprising the step of:

disregarding receipt of indicia of failure received subsequent to said first receipt of indicia and corresponding to marked ones of said entries in said pending I/O queue.

9. The method of claim 1 further comprising the step of:

removing said entries from said pending I/O queue in response to successful completion of processing of said at least one I/O request.

10. A method for restart of failed input/output operations in a system having a redundant controller management component and having a plurality of asynchronously operating I/O paths, the method comprising the steps of:

transferring at least one I/O request from said redundant controller management component to a first I/O path of said asynchronously operating I/O paths wherein said redundant controller management component has no access to said at least one I/O request as manipulated within said first I/O path;

storing in a pending I/O queue associated with said redundant controller management component an entry corresponding to said at least one I/O request transferred to first I/O path;

retrieving, in response to receipt of indicia of failure generated in response to failure of said first I/O path, all entries from said pending I/O queue corresponding to I/O requests previously transferred to said first I/O path; and sending said all entries to a second I/O path of said asynchronously operating I/O paths.

11. The method of claim 10, wherein each of said plurality of asynchronously operating I/O paths corresponds to one of a plurality of redundant multi-active controllers.

12. The method of claim 11, wherein each of said plurality of redundant multi-active controllers is a RAID storage controller.

13. The method of claim 10, wherein each of said asynchronously operating I/O paths comprises an I/O adapters.

14. The method of claim 10, wherein each of said asynchronously operating I/O paths comprises an intelligent I/O adapter.

15. The method of claim 10, wherein said at least one I/O request comprises a plurality of I/O requests and wherein the steps of retrieving and sending are performed in response to a first receipt of indicia of failure corresponding to a first failed I/O request.

16. The method of claim 15, wherein the step of retrieving includes the step of:

marking each retrieved entry in said pending I/O queue as having been resent to said second I/O path.

17. The method of claim 16, further comprising the step of:

disregarding receipt of indicia of failure received subsequent to said first receipt of indicia and corresponding to marked ones of said entries in said pending I/O queue.

18. The method of claim 10 further comprising the step of:

removing said entry from said pending I/O queue in response to completion of processing of a corresponding one of said at least one I/O request.

19. An apparatus for requeuing failed I/O requests within an I/O subsystem, said apparatus comprising:

a redundant controller management component;

a pending I/O queue associated with said redundant controller management component;

a first asynchronously operating I/O path coupled to said redundant controller management component and including means not accessible by said redundant controller management component for retaining I/O requests transferred from said redundant controller management component;

a second asynchronously operating I/O path coupled to said redundant controller management component and including means not accessible by said redundant controller management component for retaining I/O requests transferred from said redundant controller management component;

means in said redundant controller management component, responsive to receipt of an I/O request, for queueing said I/O request in said pending I/O queue;

means in said redundant controller management component, responsive to receipt of an I/O request, for transferring said I/O request to said first asynchronously operating I/O path;

means in said redundant controller management component for detecting a failure in the operation of said first asynchronously operating I/O path;

means, responsive to detection of a failure in operation of said first asynchronously operating I/O path, for retrieving all I/O requests from said pending I/O queue previously transferred to said first asynchronously operating I/O path; and means for sending said all I/O requests to said second asynchronously operating I/O path.

20. The apparatus of claim 19, wherein said first asynchronously operating I/O path is a redundant multi-active controller and wherein said second asynchronously operating I/O path is a redundant multi-active controller.

21. The apparatus of claim 20, wherein said first asynchronously operating I/O path is a RAID controller and wherein said second asynchronously operating I/O path is a RAID controller.

22. The apparatus of claim 19, wherein said first asynchronously operating I/O path is an I/O adapter and wherein said second asynchronously operating I/O path is an I/O adapter.

23. The apparatus of claim 19, wherein said first asynchronously operating I/O path is an intelligent I/O adapter and wherein said second asynchronously operating I/O path is an intelligent I/O adapter.

24. The apparatus of claim 19, wherein the means for detecting a failure in operation of said first asynchronously operating I/O path is responsive to receipt of first indicia of failure of a first failed I/O request from said first asynchronously operating I/O path.

25. The apparatus of claim 24, further comprising:

means for discarding subsequent indicia of failure of I/O requests from said first asynchronously operating I/O path wherein said subsequent indicia of failure are received by said means for detecting subsequent to the receipt of said first indicia of failure.

26. A computer readable storage medium tangibly embodying programmed instructions for performing a method for restart of a failed input/output operations operable within a system having an redundant controller management component and having a plurality of asynchronously operating I/O paths, the method comprising the steps of:

transferring at least one I/O request from said redundant controller management component to a first I/O path of said asynchronously operating I/O paths wherein said redundant controller management component has no access to said at least one I/O request as manipulated within said first I/O path;

storing in a pending I/O queue associated with said redundant controller management component an entry containing information regarding said at least one I/O request; and restarting on a second I/O path of said asynchronously operating I/O paths I/O requests having entries in said pending I/O queue previously transferred to said first I/O path in response to receipt of indicia of failure of said first asynchronously operating I/O path.

27. The storage medium of claim 26, wherein each of said plurality of asynchronously operating I/O paths corresponds to one of a plurality of redundant multi-active controllers.

28. The storage medium of claim 27, wherein each of said plurality of redundant multi-active controllers is a RAID storage controller.

29. The storage medium of claim 26, wherein each of said asynchronously operating I/O paths comprises an I/O adapter.

30. The storage medium of claim 26, wherein each of said asynchronously operating I/O paths comprises an intelligent I/O adapter.

31. The storage medium of claim 26, wherein said at least one I/O request comprises a plurality of I/O requests and wherein the method step of restarting is performed in response to a first said receipt of indicia of failure.

32. The storage medium of claim 31, wherein the method step of restarting includes the step of:

marking said entries in said pending I/O queue corresponding to the restarted I/O requests.

33. The storage medium of claim 32 wherein the method further comprises the step of:

disregarding receipt of indicia of failure received subsequent to said first receipt of indicia and corresponding to marked ones of said entries in said pending I/O queue.

34. The storage medium of claim 26 wherein the method further comprises the step of:

removing said entries from said pending I/O queue in response to successful completion of processing of said at least one I/O request.

\* \* \* \* \*